United States Patent
Johnson et al.

(10) Patent No.: US 6,895,772 B2
(45) Date of Patent: May 24, 2005

(54) OSCILLATING EVAPORATIVE COOLING DEVICE

(76) Inventors: Robert Edwin Johnson, 3849 Hidden Acres Cir., N. Fort Myers, FL (US) 33903; Janice Ann Johnson, 3849 Hidden Acres Cir., N. Fort Myers, FL (US) 33903

( * ) Notice: Subject to any disclaimer, the term of this patent is extended or adjusted under 35 U.S.C. 154(b) by 42 days.

(21) Appl. No.: 10/667,910

(22) Filed: Sep. 23, 2003

(65) Prior Publication Data

US 2004/0055325 A1 Mar. 25, 2004

Related U.S. Application Data

(66) Substitute for application No. 10/054,193 on Jan. 24, 2002, now abandoned.

(51) Int. Cl.[7] .................................................. F28D 5/00
(52) U.S. Cl. ............................ 62/314; 261/81; 454/285
(58) Field of Search ............................ 62/314; 261/81; 454/285

(56) References Cited

U.S. PATENT DOCUMENTS

| | | | | |
|---|---|---|---|---|
| 2,915,956 A | * | 12/1959 | Morrison | 454/285 |
| 3,165,052 A | * | 1/1965 | Brinen | 454/285 |
| 3,623,419 A | * | 11/1971 | Taylor | 454/285 |
| 4,719,057 A | * | 1/1988 | Mizoguchi | 261/81 |
| 5,857,350 A | * | 1/1999 | Johnson et al. | 62/314 |

* cited by examiner

*Primary Examiner*—William E. Tapolcai
(74) *Attorney, Agent, or Firm*—Robert E. Johnson

(57) ABSTRACT

The invention is directed to an evaporative cooling device including a stand-alone housing that is not connected to any structure. The housing is multi-sided and evaporative pads are placed inside the opening of each of the multi-sides. An electric centrifugal blower is placed inside the housing to draw air through all of the evaporative pads and the to discharge the same in a vertical direction through an opening in a top cover. The top cover has a directional spout placed over the opening to direct air in multi-adjusted directions. The cooling device is intended to be used in wide open playing or open fields or in open sided warehouses or work stations. A smaller size is intended to be used in semi-confined areas such as verandas, patios, lanais, porches etc. A flexible air duct can be attached to the spout so a to temporarily deliver cooled air to a confined spaces such as attics in a house.

15 Claims, 7 Drawing Sheets

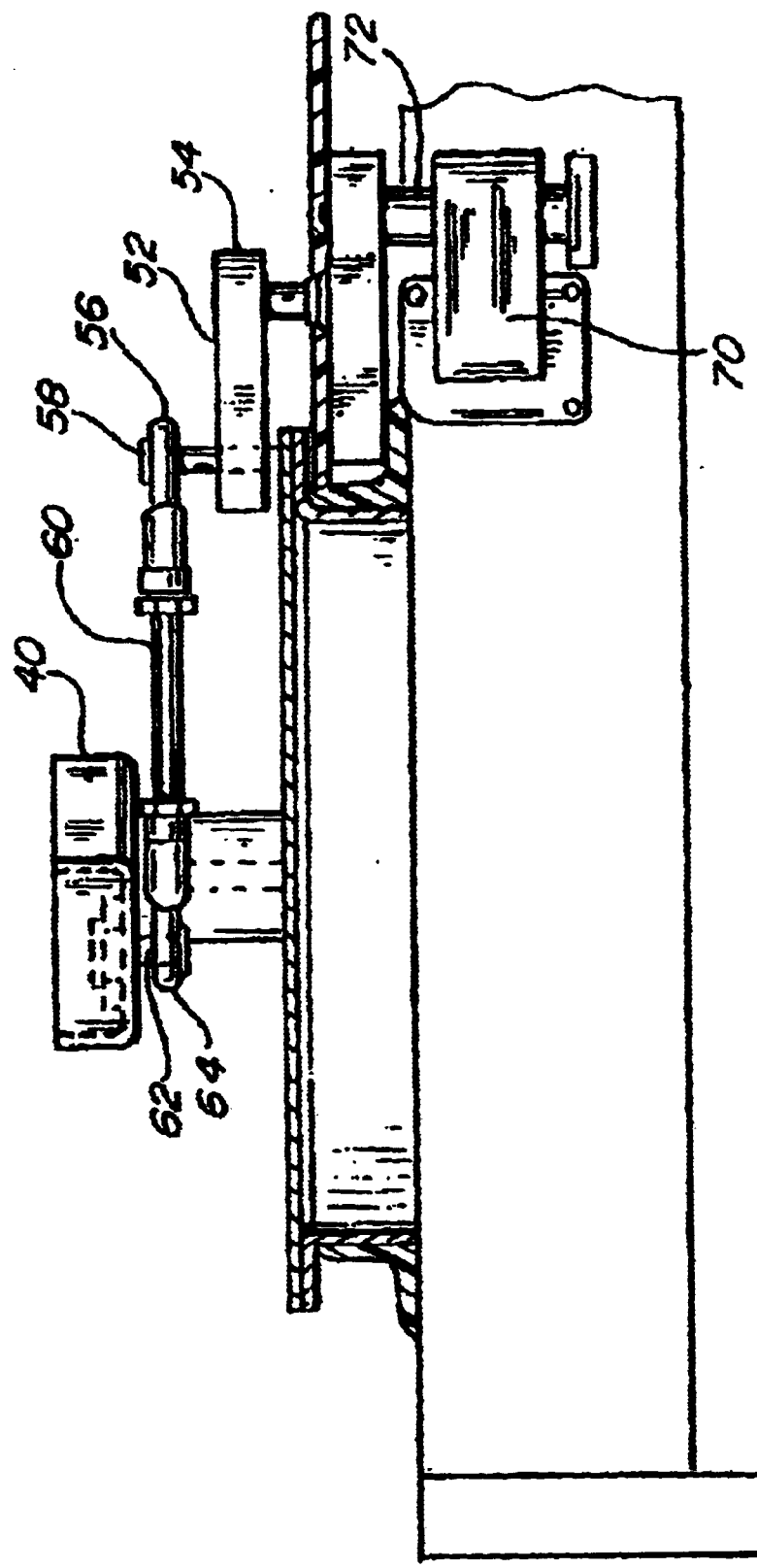

OSCILLATING EVAPORATIVE COOLING DEVICE

CROSS-REFERENCE TO RELATED APPLICATIONS

This application is a substitute for application Ser. No. 10/054,193 filed on Jan. 24, 2002, now abandoned.

STATEMENT REGARDING FED SPONSORED R & D (none)

BACKGROUND OF THE INVENTION

The present invention relates to air conditioning devices but more particularly to an evaporative air cooling device having a high speed of air passing through a curtain of water to thereby cool the air.

FIELD OF THE INVENTION

Cooling air by means of evaporative cooling has been utilized for many years. Conventional evaporative cooling devices generally include a housing which may be square or round in which an air moving device such a motor driven centrifugal blower is mounted to induce a flow of ambient air into the housing through water wetted pads, the air is cooled by the evaporative effect and the air moving device delivers the cooled air to a discharge location. Evaporative coolers of the type described above have found a wide acceptance because of their low initial and operational cost and their effectiveness at least during hot periods of relatively dry or low humidity.

OBJECTS OF THE INVENTION

All of the evaporative known cooling devices are built into or are attached to some structure to cool an interior space.

This inventive device is intended to stand alone to cool open areas that are not enclosed or at least partially enclosed but are otherwise open to the ambient air.

Porches, lanais or so-called florida rooms during hot and humid days cannot be used because the ambient air under these conditions is very uncomfortable. The same can be said for garages if one wants to work therein.

More open spaces such as patios or terraces are equally effected by heat and humidity and therefore are less desirous to be used because of the comfort level involved.

There are completely open spaces that should be cooled to some extent at selected locations such as warehouses or workstations that are open to the ambient air. Included in this category are open sport fields, such as football fields, soccer fields or tennis courts. On football fields, for example, it is known to use axial fans to cool to cool the players on the bench simply by blowing air on them and a cooling effect is obtained by the evaporative effect of the perspiration on the player's clothing and/or body. It is also contemplated that the evaporatively cooled air is to be delivered to confined areas that should be temporarily cooled and no other cooling is available or feasible.

One such area would be an attic of a house where temporary work has to be performed but the heat prevailing in the attic on a hot summer day would make such a task prohibitive. The cooling device of the invention would have an adapter so that a flexible length of an air duct could be connected an the cooled air could be delivered to the desired area.

The above objects of the invention are accomplished by presenting a stand-alone unit that is not attached to any type of a building structure. The unit is a multi-sided structure by which air will be taken in by all sides of the structure into the interior of the structure by a centrifugal blower and then delivered upwardly to a directional spout. All of the sides of the structure have at their openings evaporative water supplied pads for optimum evaporative air flow. The evaporative cooling devices will be made in different sizes depending on their intended use and application. In smaller units, the blower would have a direct drive electric motor while in larger units it would be a belt drive electric motor.

In either application, the centrifugal blower is capable of cooling much greater areas due a much greater force of air distribution.

Another object of the present invention is to provide an automatically oscillating spout to deliver air evenly across the room or a designated area. Further advantages will become apparent in the description of the invention below.

DESCRIPTION OF THE PRIOR ART

U.S. Pat. No. 5,361,600 to Kelly shows an evaporative cooler that has a multi-sided cabinet with only one evaporative cooling pad contained therein. The multi-sided cabinet creates a tunnel to direct the moving air onto the pad. This is not a stand-alone unit and is not intended to be so. The cooled air is directed to a confined area below. The unit does show a centrifugal blower to move the air.

U.S. Pat. Nos. 4,888,958 to Ella shows an evaporative cooling device using axial air flow fans that moves the ambient air to evaporative cooling pads and thereafter to a designated location by flexible air ducts. The structure is a stand-alone unit and can be moved relative to a supporting surface by means of casters.

U.S. Pat. No. 5,162,088 and 2,866,937 to Peng et al and Harris, respectively, the devices are stand-alone units that are movable relative to a supporting surface by means of casters. Both Patents show the use of axial flow fans.

U.S. Pat. No. 2,223,884 to Bolan shows an evaporative cooling unit used on an automobile. There is no driven cooling fan of any kind because the slip stream of the moving automobile creates the air flow through a wetted cooling pad. There is a movable air duct to direct cooled air to a predetermined location.

U.S. Pat. No. 3,188,007 to Myklebust is not an evaporative cooling device because there are no wettable cooling pads at all through which air may flow. It is simply a humidifier. It is a stand-alone structure, it uses a centrifugal air blower and the air is moving in from multiple sides. It does show a movable and directional spout to move air in different directions.

There are no other known evaporative cooling devices of the invention as claimed.

BRIEF DESCRIPTION OF THE DRAWINGS

FIG. 7 is a cross-section of the device of the present invention, showing the attachment of the oscillating mechanism to an electric motor.

DETAILED DESCRIPTION OF THE PREFERRED EMBODIMENT

Figure 1:
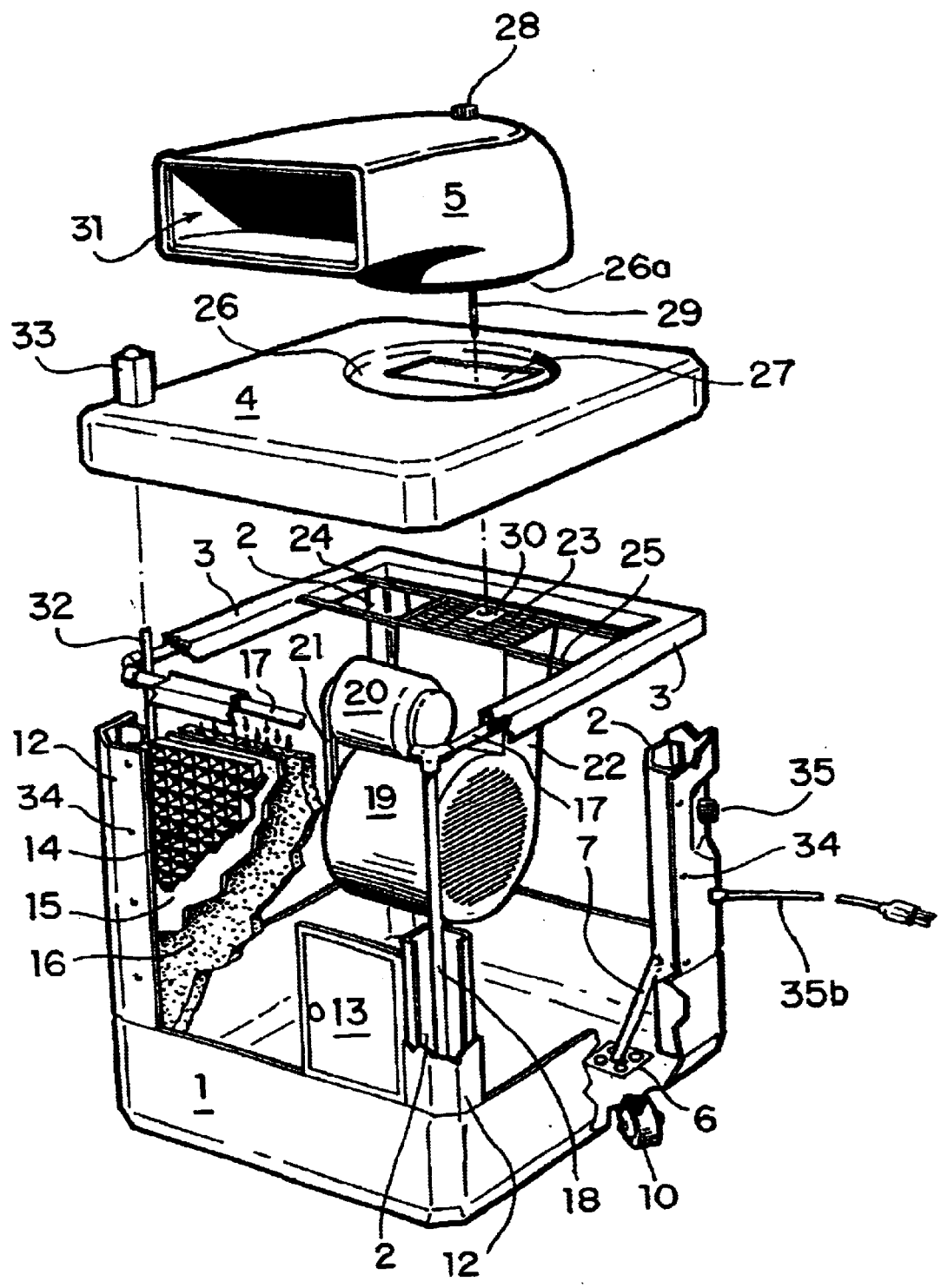
FIG. 1 shows a perspective and exploded view of the evaporative cooling device.

FIG. 1, as stated above, shows a perspective and exploded view of evaporative cooling device of the invention. As can be seen the device consists of a four sided structure in the form of a cabinet. The structure does not have to be four-sided but could instead consist of a triangular all the way up to a pentagon or an octagon. However a square configuration is preferred because of its simplicity of construction and its efficiency of operation. A triangular configuration would not deliver the magnitude of the airflow contemplated by this invention. A configuration of more than four sides would satisfy the required magnitude of the airflow but the cost of the construction would not satisfy the relative low price contemplated by this invention. Experiments have shown that more sides than four will not add to the efficiency of the device.

As can be seen in FIG. 1, the structure in its horizontal plane has a shape of a square and there is a sump 1 at the bottom of the deice.

The sump 1 is made of an ABS plastic material to avoid corrosion because of its constant contact with water. Connected to the sump 1 are four upright or vertical supports 2 which are of channel shaped configuration in the form of a pentagon, although other shapes can be used. The channels are formed into their shapes by bending or they can be extruded. It is important that they are shape-locked or made rigid by their shape because they transfer strength to the base structure of the cabinet because of the load they have to carry. Connected to the top of each of the vertical supports are horizontal braces 3 which are channels open at their bottoms the purpose of which will be explained below. The square configuration of braces 3 will receive a top cover 4, also made of ABS plastic material so as to be corrosive resistant. A directional spout 5 is attached to the cover 4 and fastened in a way to be explained below. To complete the structure of the cabinet and its sturdiness, reinforcing plates 6 are attached to all four corners of the sump 1. The plates are further reinforced by upwardly extending braces 7 which are attached by welding to the plates 6 and then to the corner vertical supports 2 by either welding or by bolts or rivets. Since the sump 1 will contain water, the water is supplied by a coupling (not shown) through a hose 9. One of the objects indicated above, has been that the unit, structure or cabinet should be free standing and be movable.

Therefore, casters 10 are provided to render the structure movable relative to a support surface.

There are corner covers 12, also made of a corrosion ABS plastic material, which are fastened to the channel-shaped vertical supports 2 by either rivets or bolts 34. As can be seen, the structure or the cabinet now has large openings on all of its four sides. The openings are now provided with the necessary elements to make it into an evaporative cooling device. To this end, panels are provided and removably fastened in the openings. A high efficient evaporative pad 16 is placed innermost in the opening and it is constantly wetted by water drip pipes 17 placed on top of each panel.

The water drip pipes 17 are placed in the horizontal channels 3 which are open at their bottoms, as explained above, so that the drip pipes are concealed therein but at the time can execute their function and that is to deliver water to the top of the evaporative panels 16 so that water can thoroughly wet the same by gravity flowing downwardly.

Finally, there is an outer plastic honeycomb panel 14 closing off the opening. While this is not exactly essential, it protects the inner panels from damage and lends an aesthetic appearance to the overall structure.

Returning to the sump 1 in the bottom of the structure or cabinet, there is a water hose connection 8 for the supply of water through the water hose 9. At this point it should be stated that in most devices, the water sump 1 is large enough to hold water of sufficient volume for an operation of up to eight hours so that the water supply hose does not to continuously stay connected to assure an extended cooling operation. This feature makes the device a truly stand-alone unit. In order to make the device movable to a supporting surface, casters 10 are provided on all four corners which are fastened to support plates 6. In order to finish the structure or cabinet, the corner covers 12 are provided on all four corners and they are fastened to the vertical support 2 by way of screws or rivets 34. An access door 13 is provided through the sandwich of evaporation pad 16, and the outer honeycomb cover 14 so that access can be had through the sandwich to the interior of the device to gain access to the drain plug 43 (FIG. 4) or to place a block of ice therein during extreme temperature conditions.

Water drip pipes 17 are placed are within the open bottoms of the channels 3 so that are concealed therein whereby the dripping water will wet the evaporative pads and will flow downwardly by gravity and any excess water will return to the sump 1. Water is supplied to the drip pipes 17 by vertical water delivery pipes 18, as will explained in more detail below.

There is a centrifugal blower 19 which draws air into the interior of the device from all four sides. The blower is driven by an electric motor 20 and by a belt or belts 21. A belt drive is preferred in larger units that are used in wide open areas.

The centrifugal blower is contained in housing 22 with its exit 23 is supported by braces 24 and 25 at an upper end of the structure or cabinet.

The top cover has a circular recess 26 which matches the lower ring 26a of the top cover 4. This enables the spout 6 to be rotatable relative to the cover 4. The exit 23 of housing 22 matches the rectangular opening 27 in the top cover 4. The exit 23 of housing 22 matches the rectangular opening 27 in the top cover 4 so as to be connected thereto in an air tight manner.

It is desirable that the spout be arrestable in any of the rotatable positions.

To this end, there is an adjusting knob 28 at the top of the spout 5 which knob in turn is fastened to screw threaded bolt 29. The screw threaded bolt 29 is received in a Nylon lock nut which is fastened by brackets in the opening 23. In this manner, when the knob 28 is turned in a clockwise fashion, the spout 5 with its ring 26a is arrested within the circular recess 26 of the top cover 4. This arrangement assures that the spout stays in its adjusted direction because any vibration cannot jar loose the clamping effect.

It is desirable, at any time, to quickly ascertain the water level in the sump when the device is used as a stand-alone unit and is not connected to the water supply hose 9. there is a float rod 32 which has at its bottom a float ball 32a (FIG. 3) and the float rod extends into the water level indicator 33 which is mounted on top of cover 4. The float ball 32a rides on top of the water level in sump 1 and it rises or lowers the floatof the float rod 32 which follows the movements of the float ball 32a and such movements are indicated at the water level indicator.

Finally, there is a six position switch 35 mounted on one of the plastic corner covers 12, the function of which will be explained below with reference to FIG. 5.

Figure 2:
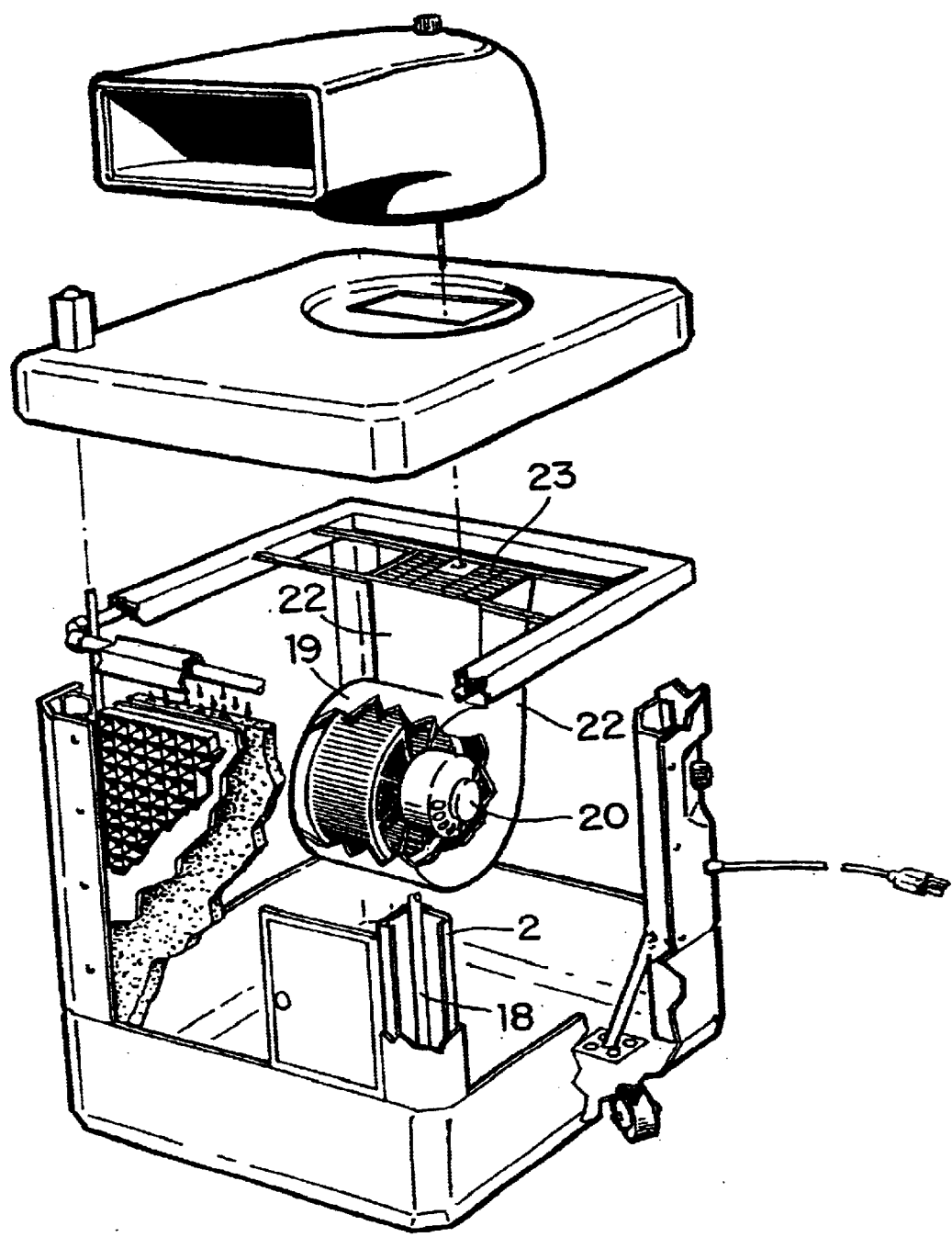
FIG. 2 shows the same view of FIG. 1 but with a different drive system.

Reference is now made to FIG. 2 wherein like reference characters have been applied to the same elements as shown in FIG. 1 The only difference from FIG. 1 to FIG. 2 is that the drive motor 20 driving the blower 19 is a direct drive motor to thereby eliminate the belt or belts. This kind of drive is preferred in smaller devices or cabinets that should be used in semi-enclosed structures such as porches, lanais, garages etc.

Figure 3:
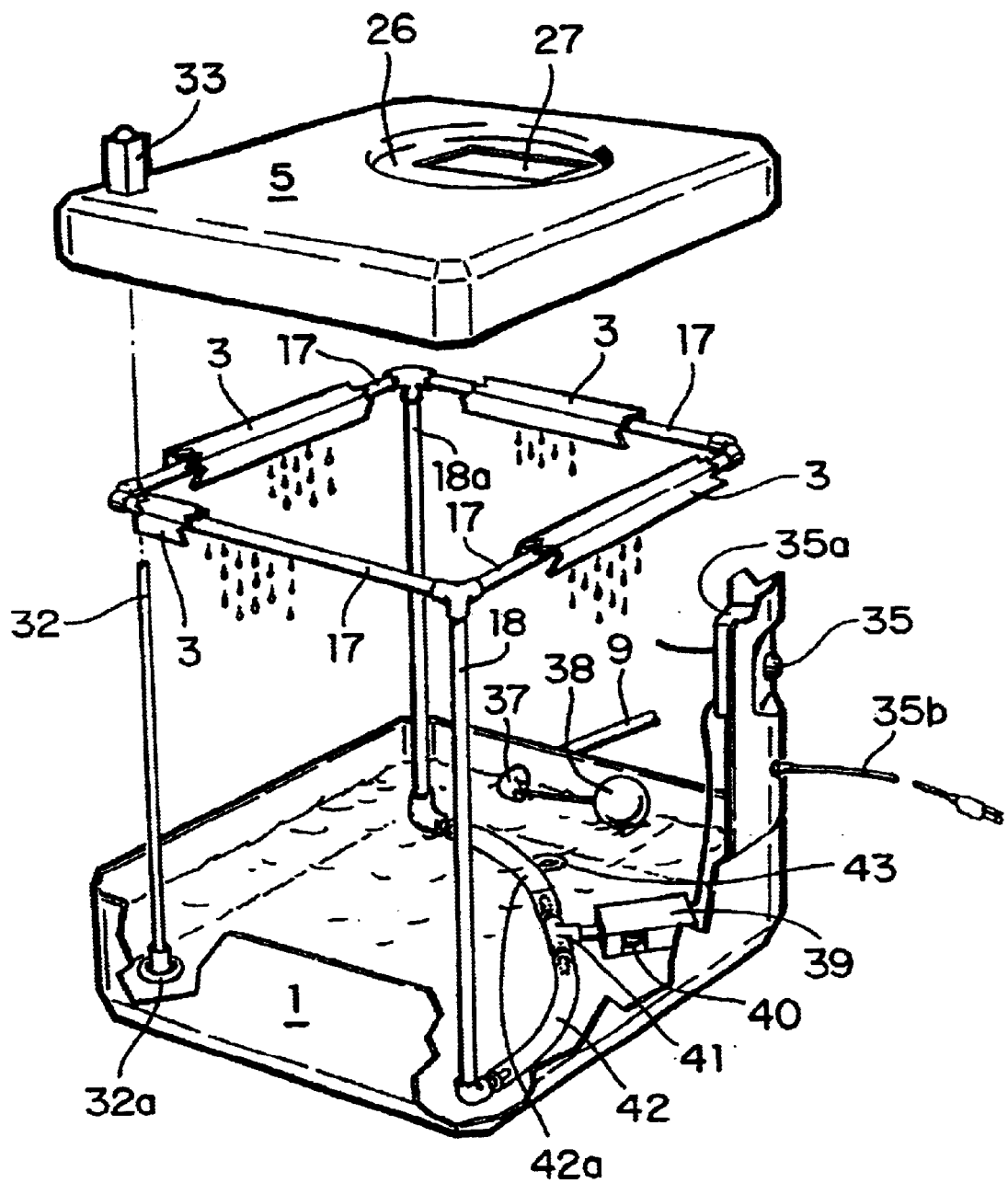
FIG. 3 shows a more detailed view of the interior of the cooling system of the invention.

FIG. 3 is a perspective and an exploded view of the evaporative cooling device which allows a more detailed view of the interior of the device. Like reference characters have been applied in this view as can be found in FIGS. 1 and 2. There is water connection 8 which is connected to the water hose 9. The water connection 8 leads into a water shut-off device 37. The water shut-off device is intended to shut off the water supply to the sump when a maximum of water is detected within the sump. This detection is accomplished by the float ball 38.

There is also a sump pump 39 which supplies water to drop pipes 17 located within the channels 3. the sump pump 39 has a float 40 which controls the operation when a minimum of water level in sump 1 has been detected. When the pump 39 is in operation, the pumped water from the pump exits into a divider tee 41 which directs water to two diagonally placed vertical water supply pipes 18 and 18a by way of water hoses 41 and 42.

With reference to FIG. 1, it has been indicated that there is a six position rotary switch 35 mounted on one of the corner covers 12. In FIG. 3 it can be seen that the rotary switch 35 is connected to switch housing interiorly of the corner cover 12. A power line 35b leads to into the housing. The various positions and functions of the switch 35 are shown in FIG. 5.

Figure 4:
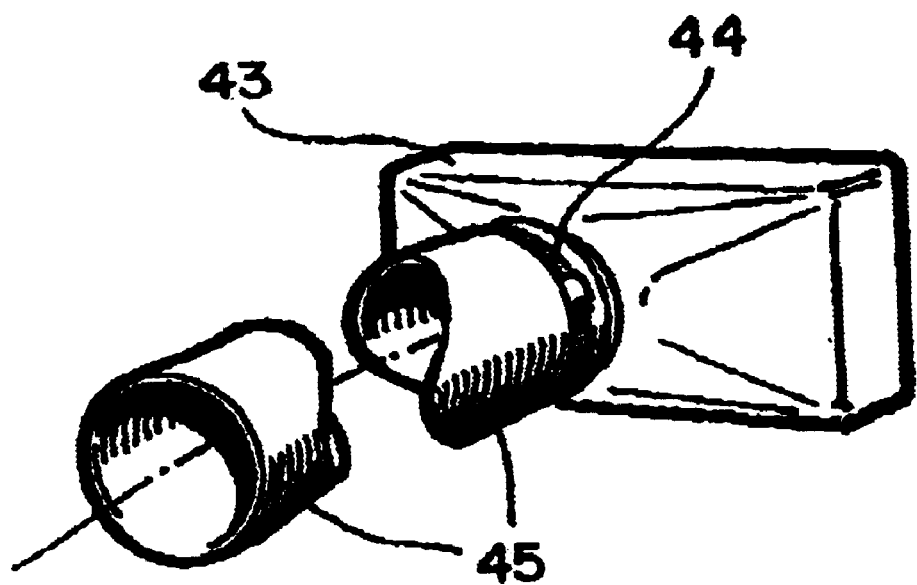
FIG. 4 shows a further development of the invention.

FIG. 4 shows a further development of the invention wherein the evaporatively cooled air can be directed to specifically enclosed areas, such as when working in an attic, and of course in other areas, on a temporary basis. This is accomplished by providing an adapter 43 which fits over the opening 31 of spout 5. As can be seen, the rectangular opening 31 is converted into a round opening to accommodate a circular and flexible air duct 45. The air duct 45 is fastened to the adapter by means of the well known clamping ring 44.

Figure 5:
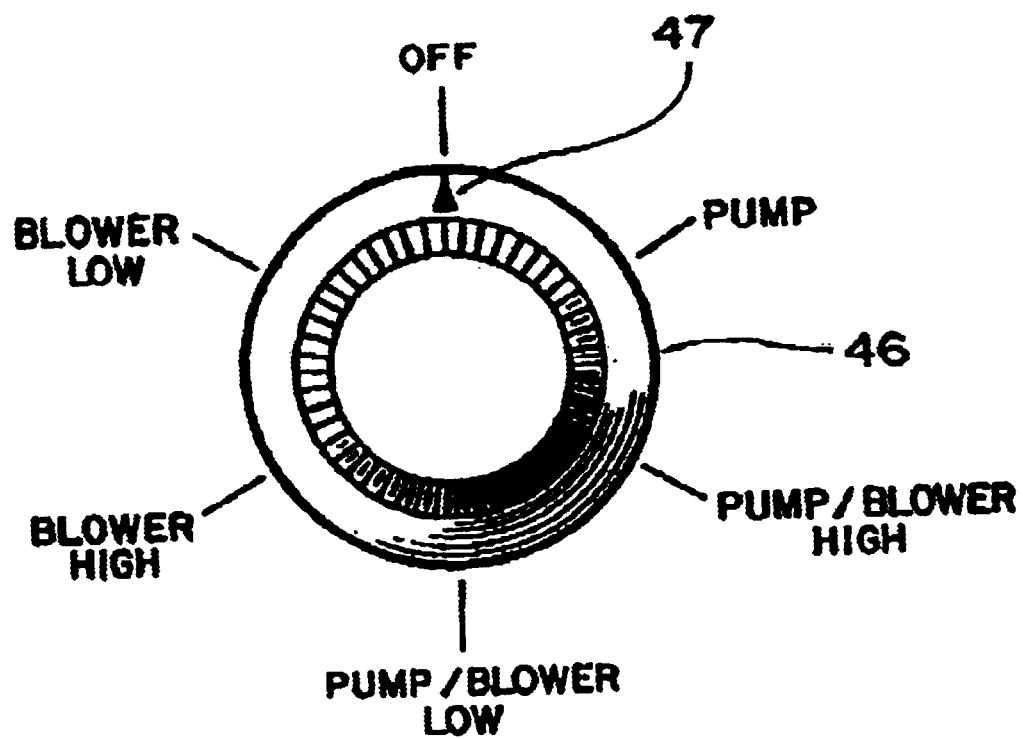
FIG. 5 shows a rotary switch used with the invention.

The rotary switch 35 in FIG. 5 seems to be self-explanatory. At the 12 o'clock position there is a system OFF position. The 2 o'clock position operated the pump only. This is desirable when a pre-wetting of the evaporative pads is preferred. The pump and blower high speed position is called for under extreme temperature and humidity conditions, while the 6 o'clock position will suffice under low humidity and/or temperature conditions. The 8 o'clock position is used to dry the evaporative pads after a shut-down of the device and when high humidity conditions are prevailing. While the 10 o'clock position is desired when the system is shut down and drying of the pads is easily accomplished when the ambient air humidity is low. A drying of the evaporative pads after the system has shut-down is highly desirable because any moisture inherently remaining in the pads will lead to undesirable formations of mold or formations formed by calcium deposits which tend to clog the open spaces within the evaporative pads.

In a second embodiment of the present invention, the spout 5 is attached to the device in such a manner so that the spout oscillates alternatively clockwise and counterclockwise about an axis defined by the threaded bolt 29.

Figure 6A:
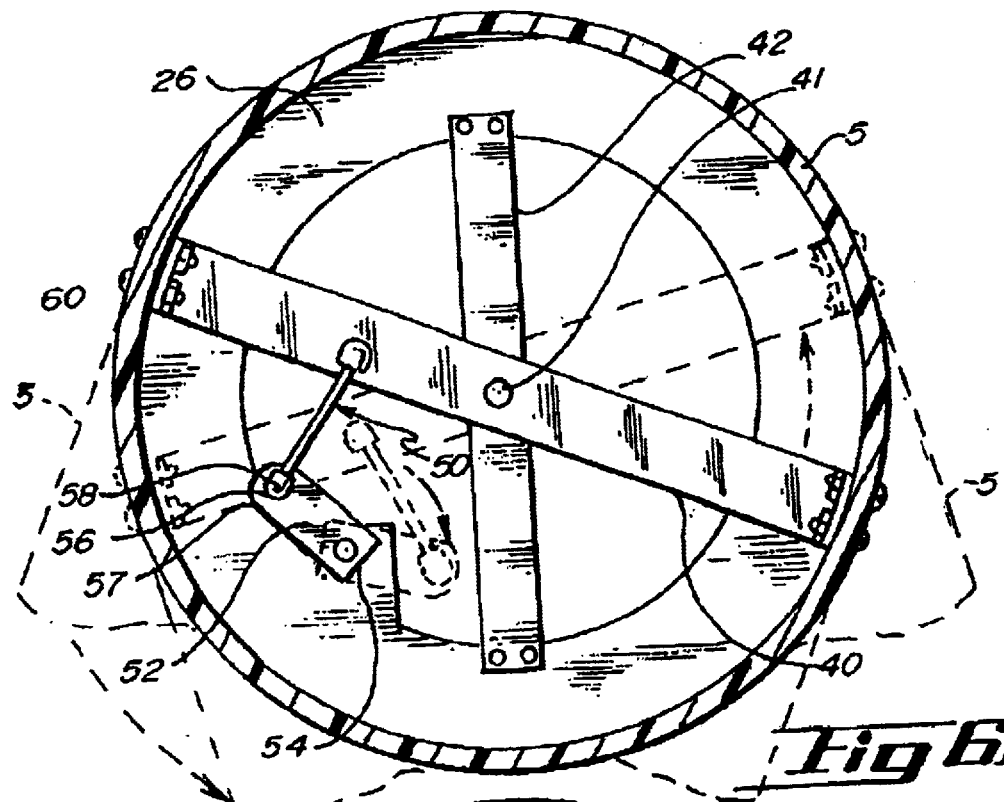
FIG. 6A is a detailed cross-section of the device of the present invention, showing the operation of the oscillating mechanism.
Figure 6B:
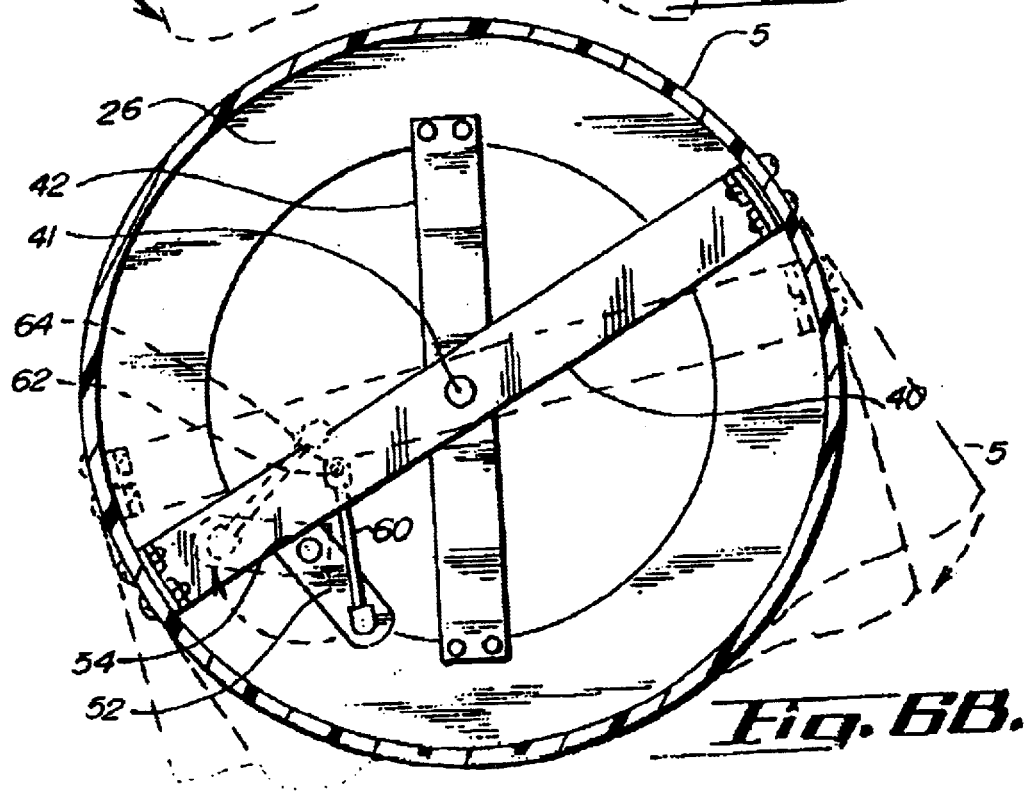
FIG. 6B is the same as FIG. 6A with the oscillating mechanism in a second position.

In the second embodiment, shown in FIGS. 6A and 6B, the spout 5 is attached to cross member 40. In turn, cross member 40 is pivotally connected to the threaded bolt 29. Threaded bolt 29 passes through aperture 41 and then threadingly engages cross strut 42.

A linkage 50 is attached, preferably, to the circular recess 26. The linkage 50 comprises a rotating block 52 which is connected at a first end 54 to an oscillating electric motor 70 by its shaft 71. As the shaft rotates, the rotating block 52 moves clockwise in the direction indicated by the small arrow in FIG. 6A.

A socket 56 is formed in the second end 57 of the rotating block 52. A ball 58 is loosely engaged in the socket 56 so that the ball may move in three axes of rotation. Connected to the ball 58 is a rod 60. The rod 60 is also connected to a secondary ball 62 at the other end of the rod 60, and the secondary ball rotates freely in the secondary socket 64 The socket 64 is securely attached to the cross member 40 at a point displaced from the threaded rod 29, the axis of rotation of the spout 5.

As seen in FIGS. 6A and 6B, as the rotating block 52 rotates in the direction shown by the arrow, the rod 60 will rotate freely in the socket 56 and secondary socket 64, moving from the position shown in FIG. 6A to that shown in phantom in FIG. 6A. As it does so, the rod 60 will cause the spout 5 to rotate about the threaded rod 29, between the positions shown in phantom lines in FIG. 6A. As the rotating block 52 continues to rotate, the rod will cause the spout 5 to rotate back as is shown in FIG. 6B, and so forth.

The present invention may be embodied in other specific forms without departing from the spirit or essential attributes thereof, and it is therefore desired that the present embodiment be considered in all respects illustrative and not restrictive, reference being made to the appended rather than the foregoing description to indicate the scope of the invention.

What we claim is:

1. An evaporative stand-alone cooling device comprising:
   (a) a housing having a multiple of open vertical sides including wettable evaporative pads placed in each of said openings of said open vertical sides;
   (b) means for delivering water to each top of said evaporative pads to flow downwardly through said pads by gravity;
   (c) a sump located at the bottom of said housing to collect excess water therein from said evaporative pads;
   (d) a pump placed in said sump being the said means for delivering water to the top of each of the pads and a float is located in said sump to detect a minimum level of water in said sump to stop said pump;
   (e) said housing further including a centrifugal blower driven by a first electric motor, said blower being mounted in said housing so as to create a positive pressure of vertically flowing air while at the same time creating a negative pressure of laterally flowing air through said evaporative pads;
   (g) means for driving an oscillating and rotatable spout being placed over said opening to direct air in multiple directions;
   wherein said spout has a circular bottom ring and said top cover has a circular recess receiving said ring including means for clamping said spout in any adjustable rotational position.

2. The evaporative cooling device of claim 1, wherein each of said evaporative pads is of a sandwich construction consisting of said evaporative pad being placed innermost in each of said open vertical sides and a grid being placed most outwardly in said in said open vertical sides to protect said evaporative pads from damage and to enhance the aesthetic appearance of said housing.

3. The evaporative cooling device of claim 1, wherein said first electric motor is a direct drive motor.

4. The evaporative cooling device of claim 1, wherein said first electric motor is a belt drive motor.

5. The evaporative cooling device of claim 1 including a water connection in said sump for delivering water into said sump.

6. The evaporative cooling device of claim 5, wherein said water connection is connected to a water valve device including a float to detect a maximum of water level in said sump to shut off the water supply.

7. The evaporative cooling device of claim 1, wherein a movable access door is provided in one of said evaporative pads to be able to gain access to the interior of said housing.

8. The evaporative cooling device of claim 1, wherein vertical supports are placed in each corner of said multi-sided housing and wherein the tops of said supports are connected by channel braces which are open at their bottom and water dripping pipes are placed and concealed within said channels.

9. The evaporative cooling device of claim 1, wherein said means for clamping consists of a knob at the top of said spout being connected to a downwardly extending threaded bolt, the end of which is being received in a Nylon lock nut having been mounted in the top of said housing.

10. The evaporative cooling device of claim 1, wherein said spout has a rectangular opening and an adapter is placed over said opening to convert the same to a circular opening.

11. The evaporative cooling device of claim 1 including an electric rotary switch mounted on said housing to control the speed of said pump and said blower singly or in combination.

12. The evaporative cooling device of claim 1 including casters placed at the bottom of said housing to be moved relative to a supporting surface.

13. The evaporative cooling device of claim 1, further comprising a second electric motor and a linkage between said second motor and said oscillating and rotatable spout, said linkage being adapted to rotate said oscillating spout alternatively clockwise or counterclockwise.

14. The evaporative cooling device of claim 13, wherein said linkage further comprises a rotating block having a first end being connected to said second electric motor at said first end, a socket formed in said second end, a ball loosely engaged in said socket, a rod connected to said ball at a first end of said rod, a second end, the second end of said rod being connected to a secondary ball loosely engaged in a secondary socket, said secondary socket being attached to a cross member being attached to said oscillating, rotatable spout.

15. An evaporative stand-alone cooling device comprising:

(a) a housing having a multiple of open vertical side including wettable evaporative pads placed in each of said openings of said vertical sides;

(b) means for delivering water to each top of said evaporative pads to flow downwardly through said pads by way of gravity;

(c) a sump is located at the bottom of said housing to collect excess water therein from said evaporative pads;

(d) a pump is placed in said sump being the said means for delivering water to the top of each of said pads and a float is located in said sump to detect a minimum level of said water in said sump to stop the pump;

(e) said housing further including a centrifugal blower being driven by a first electric motor, said blower being mounted in said housing so as to create a positive pressure of vertically flowing air while at the same time creating a negative pressure of laterally flowing air through said evaporative pads;

(f) said housing further includes a cover at its top having an opening to accommodate said vertically flowing air;

(g) an oscillating, rotatable spout is being placed over said opening to direct air in multiple directions; and (h) further comprising a second electric motor and a linkage between said second electric motor and said oscillating, rotatable spout, said linkage being adapted to rotate said oscillating rotatable spout alternatively clockwise and counterclockwise, (i) wherein each of said evaporative pads is of a sandwich construction consisting of said evaporative pads being placed innermost in each of said vertical open sides and a grid is placed most outwardly in said open vertical sides to protect said evaporative pad from damage and to enhance the aesthetic appearance of the housing.

* * * * *